Sept. 6, 1927.  D. R. PRICE ET AL  1,641,693
SYNCHRONOSCOPE
Filed Oct. 25, 1926
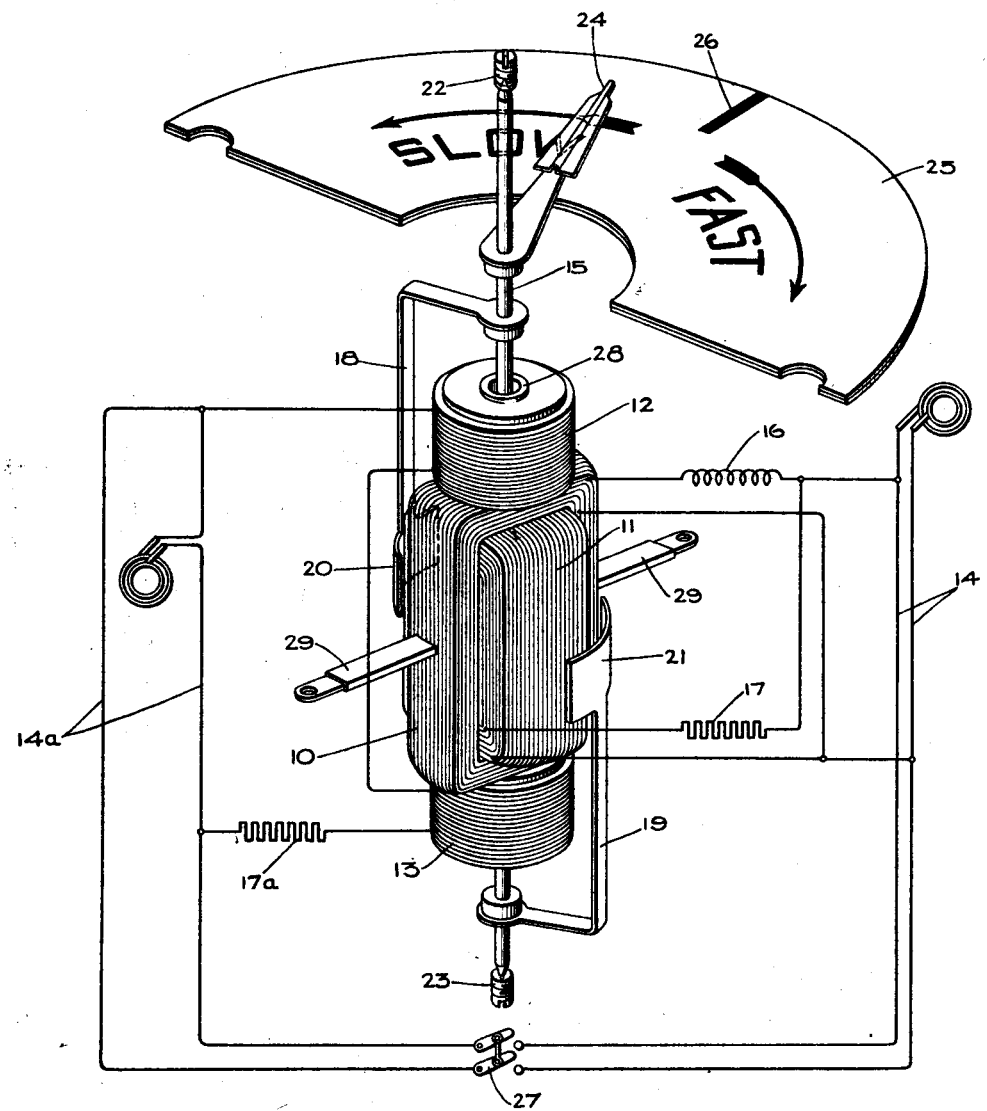
Inventors:
David R. Price,
Francis H. Bowman,
by *Alexander F. Smith*
Their Attorney.

Patented Sept. 6, 1927.

1,641,693

UNITED STATES PATENT OFFICE.

DAVID R. PRICE, OF LYNN, AND FRANCIS H. BOWMAN, OF SWAMPSCOTT, MASSACHUSETTS, ASSIGNORS TO GENERAL ELECTRIC COMPANY, A CORPORATION OF NEW YORK.

SYNCHRONOSCOPE.

Application filed October 25, 1926. Serial No. 143,953.

Our invention relates to synchronoscopes and its object is to provide a highly reliable and accurate instrument of this character.

The magnitude and importance of modern alternating current generators and the systems which they supply makes it imperative that no serious shock shall occur to the apparatus or system when synchronizing operations are performed. The synchronoscope is an instrument for indicating the correct frequency and phase condition for connecting two alternating current generators or systems together and its most important requisites are reliability and accuracy. The instrument of our invention meets these requirements and at the same time is of relatively inexpensive and simple construction. Accurate synchronoscopes of the prior art employ a rotating coil system of relatively heavy construction necessitating collector rings and relatively expensive bearings. The troubles incident to such a construction are avoided by our invention in that the energizing coils of our synchronoscope are made stationary and are permanently connected to the energizing leads. The rotating part of the instrument is extremely light and is able to follow the rotating magnetic field of the device exactly, even over a considerable range of frequency.

The features of our invention which are believed to be novel and patentable will be pointed out in the claims appended hereto. For a better understanding of our invention reference is made in the following description to the accompanying drawing which shows a perspective view of the essential parts of our improved synchronoscope and the connections for synchronizing two alternating current generators.

Referring to the drawing, the stationary coil system preferably comprises four coils 10, 11, 12 and 13. Coils 10 and 11 are connected to one of the systems 14 and coils 12 and 13 are connected to the other system 14$^a$ which is to be synchronized with system 14. Coils 10 and 11 are connected in parallel but have means such as the reactance 16 in series with coil 10 and resistance 17 in series with coil 11 to produce a phase angle difference in their currents. These coils are also positioned at substantially right angles to each other, this angle corresponding to the phase angle difference of their currents so that they will produce a rotating magnetic field corresponding to the phase angle and frequency of system 14. A shaft 15 passes through the longitudinal axis of these coils and is surrounded by coils 12 and 13 which are connected in series through a resistance 17$^a$. Coils 12 and 13 might be connected in parallel if desired, so long as their phase relation is kept the same. Secured to shaft 15 and extending in opposite directions therefrom at either end of the stationary coil system are magnetic arms 18 and 19. These arms are then bent at right angles and terminate in light magnetic curved vanes 20 and 21 closely adjacent and on opposite sides of the coils 10 and 11 where they are within the influence of the rotating magnetic field set up by said coils. Suitable means such as the shaft 15, or at least that part which extends between arms 18 and 19 through the coils, is preferably made partially or wholly of magnetic material to provide a magnetic circuit along the axis of rotation. The shaft 15 is suitably supported in bearings 22 and 23 and carries the synchronizing pointer 24 which cooperates with the usual synchronoscope scale 25.

The operation of the device may be understood from the following explanation. Coils 10 and 11, due to their connections through the phase modifying arrangement to circuit 14, will produce a rotating magnetic field about the axis of shaft 15 and if coils 12 and 13 are not energized, this magnetic field will carry the iron vanes and the remainder of the rotating parts around with this field. However, when coils 12 and 13 are energized from the alternating current system 14$^a$ the magnetic shaft and magnetic vanes become magnetized first in one direction and then in the opposite direction. That is, at one instant vane 20 will be a positive magnetic pole and vane 21 a negative magnetic pole and during the next half cycle of system 14$^a$ vane 20 will be of negative polarity and vane 21 of positive polarity. Thus, if the frequency of system 14ª is the same as that of system 14, the polarities of the magnetic vanes will reverse at the same rate as the speed of the rotating magnetic field and the vanes will stand still at a position depending upon the phase relation between the two systems. If the system frequency of 14ª is slightly lower than that of system 14, the pointer 24 will rotate slowly in one direction and if the frequency of system 14ª is slightly high, the pointer will rotate slowly in the opposite direction. The position of pointer 24 on shaft 15 is adjusted so that when the phase angle between the two systems is zero, pointer 24 will stand opposite the synchronizing mark 26 of the scale 25. When pointer 24 moves slowly up to mark 26 the instrument indicates that the two systems may be safely connected together as by the switch 27 so far as frequency and phase angle is concerned.

The moving parts of this device are extremely light and will quickly respond even though the voltage might be very low. Collector rings and brushes are avoided and all circuit connections to the instrument leads are permanent; thus, troubles due to poor brush contact are not present. The volt ampere burden of this instrument is compartively low and if desired the instrument may be left in circuit continuously.

The manner in which the stationary coil structure is held in place while allowing the free continuous rotation of the shaft is indicated in the drawing. The stationary coil system is assembled around a hollow tube 28 through which the shaft 15 freely passes. The stationary coil system is supported at its center by arms 29 extending outwardly to the case of the instrument, not shown. These arms come between the paths of rotation of the upper and lower vanes 20 and 21 so as not to interfere therewith. These arms preferably contain no magnetic material such as might divert the flux and may be made of brass and are suitably insulated from but securely hold the coils in any desired manner.

In accordance with the provisions of the patent statutes, we have described the principle of operation of our invention, together with the apparatus which we now consider to represent the best embodiment thereof, but we desire to have it understood that the apparatus shown and described is only illustrative and that the invention may be carried out by other means.

What we claim as new and desire to secure by Letters Patent of the United States, is,—

1. A synchronoscope provided with stationary energizing windings adapted to be connected to two alternating current circuits whose condition of synchronism is to be determined, and rotary magnetic means influenced by the fluxes of said windings when so connected for indicating the condition of synchronism between said circuits.

2. A synchronoscope comprising a rotatably mounted shaft, stationary windings adapted to be connected to two alternating current systems whose condition of synchronism is to be determined for producing a rotating magnetic field about the axis of rotation of said shaft, in accordance with the frequency of one of said systems, and an alternating magnetic field along the axis of rotation of said shaft, in accordance with the frequency of the other of said systems, and magnetic means secured to said shaft and influenced by both of said magnetic fields for actuating said shaft in accordance with the condition of synchronism between said systems.

3. A synchronoscope comprising a rotatably mounted shaft, a stationary coil system adapted to be connected to one alternating current system for producing a rotating magnetic field about the axis of rotation of said shaft, a stationary coil system adapted to be connected to another alternating current system for producing an alternating magnetic field along the axis of rotation of said shaft, and magnetic means secured to said shaft and influenced by both of said magnetic fields for rotating said shaft in accordance with any difference in frequency of the two systems and positioning the shaft in its rotative position in accordance with any difference in the phase angle between the two systems.

4. A synchronoscope comprising a pair of stationary coils arranged at an angle to each other in a common longitudinal axis, said coils being connected in parallel to an alternating current circuit through means for causing the phase angle of their currents to be approximately equal to the mechanical angle between them whereby said coils are caused to produce a rotating magnetic field about said axis, a rotatably mounted shaft extending through said coils along said axis, magnetic vanes secured to said shaft and extending into the region of said rotating magnetic field on opposite sides of said axis, and a stationary winding connected to another alternating current circuit for alternately magnetizing said magnetic vanes with opposite magnetic polarities.

5. A synchronoscope comprising stationary coils arranged to produce a rotating magnetic field about the longitudinal axis of said coils, stationary coils for producing an alternating magnetic field along said axis, a rotatably mounted shaft of magnetic material extending through said coils along said axis, magnetic arms secured to said shaft at either end of said stationary coil system and extending into the region of the rotating magnetic field on opposite sides of said coils, and means for supporting said stationary coil system while allowing the free rotation of said shaft and magnetic arms, comprising supporting means extending from said coil system in the space between the paths of rotation of said magnetic arms.

In witness whereof, we have hereunto set our hands this 21st day of October, 1926.

DAVID R. PRICE.
FRANCIS H. BOWMAN.